United States Patent [19]

Wagenaar

[11] 3,793,477

[45] Feb. 19, 1974

[54] CONDENSER BUSHING HAVING DISPLACED GAPS BETWEEN CONDUCTING LAYERS

[75] Inventor: Loren B. Wagenaar, Muncie, Ind.

[73] Assignee: Westinghouse Electric Corporation, Pittsburgh, Pa.

[22] Filed: Jan. 19, 1973

[21] Appl. No.: 324,947

[52] U.S. Cl. .............. 174/143
[51] Int. Cl. .............. H01b 17/28
[58] Field of Search .............. 174/73 R, 143

[56] References Cited

UNITED STATES PATENTS

| | | | |
|---|---|---|---|
| 1,868,605 | 7/1932 | Jansson | 174/143 UX |
| 2,650,334 | 8/1953 | Skeats | 174/143 X |
| 3,462,545 | 8/1969 | Grimmer | 174/143 |
| 3,588,319 | 6/1971 | Isogai et al. | 174/143 |
| 3,600,502 | 8/1971 | Wagenaar et al. | 174/143 |
| 3,659,033 | 4/1972 | Grimmer | 174/143 X |
| 3,692,928 | 9/1972 | Friedrich | 174/143 |

FOREIGN PATENTS OR APPLICATIONS

| | | | |
|---|---|---|---|
| 478,839 | 3/1953 | Italy | 174/143 |

*Primary Examiner*—Laramie E. Askin
*Attorney, Agent, or Firm*—J. R. Hanway

[57] ABSTRACT

An electrical bushing having condenser elements formed of two or more conducting layers. In one arrangement, a gap between conducting layers of one condenser element is completely surrounded by one of the conducting layers of the next adjacent condenser element. In another arrangement, gaps in condenser elements located on the same side of the displaced gap condenser element are substantially aligned with each other. With both arrangements, the points of equal potential stress are substantially uniform, thereby permitting the efficient use of bushing insulation.

6 Claims, 5 Drawing Figures

CONDENSER BUSHING HAVING DISPLACED GAPS BETWEEN CONDUCTING LAYERS

BACKGROUND OF THE INVENTION

1. Field of the Invention

This invention relates, in general, to electrical bushing assemblies and, more specifically, to electrical bushing assemblies containing condenser structures.

2. Description of the Prior Art

The condenser structure in high-voltage electrical bushings provides a means for distributing electrical stresses substantially uniformly throughout the insulation structure of the bushing. The concept of using concentric conducting layers disposed around the lead tube of the bushing is well known. However, the effective use of condenser structures in bushings designed for extremely high voltages presents problems uncommon with lower voltage bushings.

The concentric conducting layer which is positioned adjacent to the lead tube generally has a larger axial dimension than the conducting layer which is positioned adjacent to the grounded flange assembly of the bushing. Normally, it is desirable to provide equal capacitance between adjacent conducting layers whether the insulation comprises cellulosic paper, epoxy resin, or any other suitable dielectric material. However, when the bushing is extremely large, the innermost conducting layers are too much larger than the outermost layers to provide uniform capacitance. Thus, without some modification, more capacitance would be developed between the innermost layers due to the larger surface areas.

Modifying the condenser structure to provide uniform capacitance is required to produce a suitable bushing assembly. The length of the innermost conducting layers cannot be reduced because these layers must extend the length of the insulation structure. The length of the outermost conducting layers cannot be increased because they would reduce the effective length of the weather casings and lower the voltage at which flashover might occur.

The inventions disclosed in U.S. Pat. Nos. 3,462,545 and 3,659,033, which are both assigned to the same assignee as is this invention, teach condenser structures which provide substantially uniform capacitance radially across most of the insulation structure. Although highly useful in certain bushings, the unique condenser structure taught in U.S. Pat. No. 3,462,545 exhibits some undesirable characteristics when the size of the bushing is extremely large. The larger the bushing, the greater the gap between the conducting layers. A large gap distance causes the equipotential lines to concentrate at some location in the region of the gaps, thereby causing higher voltage gradients at that location. The greater the gap distance, the more the equipotential lines concentrate, and the more the voltage gradient increases. Thus, the problem of efficiently using the condenser insulation is more difficult to solve. In U.S. Pat. No. 3,659,033, great care must be used to adjust the capacitance of each of the condenser sections in order that each will see its proper condenser sections in order that each will see its proper share of the voltage. Also, when the bushing is extremely large, the gap regions are still sufficiently large to allow significant bending of the equipotential lines.

Therefore, it is desirable, and it is an object of this invention, to provide a condenser bushing in which the condenser elements are economically and effectively arranged to provide a uniform capacitance pattern without producing regions of high voltage gradient concentration.

SUMMARY OF THE INVENTION

There is disclosed herein new and useful bushing condenser structures which conveniently distribute the voltage stresses uniformly across the bushing insulation. In one arrangement, the condenser structure contains a plurality of condenser elements most of which have at least two conducting layers. Gaps between the conducting layers are staggered in adjacent condenser elements so that one of the conducting layers completely surrounds the gap in the adjacent condenser element. This pattern is repeated radially throughout the condenser structure. This arrangement provides a uniform capacitance between the condenser elements without producing a large region in the condenser structure which is not occupied by one or more conducting layers. Thus, the equipotential lines are not distorted generally and high voltage stress concentrations are not developed in the bushing insulation. In another arrangement, the gaps in two adjacent condenser elements are displaced and the gaps in the remaining condenser elements of the condenser structure are aligned with each other on the same side of the displaced gaps. This arrangement is useful for bushings having voltage ratings which can tolerate some stress concentration in the insulation structure.

BRIEF DESCRIPTION OF THE DRAWINGS

Further advantages and uses of this invention will become more apparent when considered in view of the following detailed description and drawing, in which.

DESCRIPTION OF THE PREFERRED EMBODIMENTS

Figure 1:
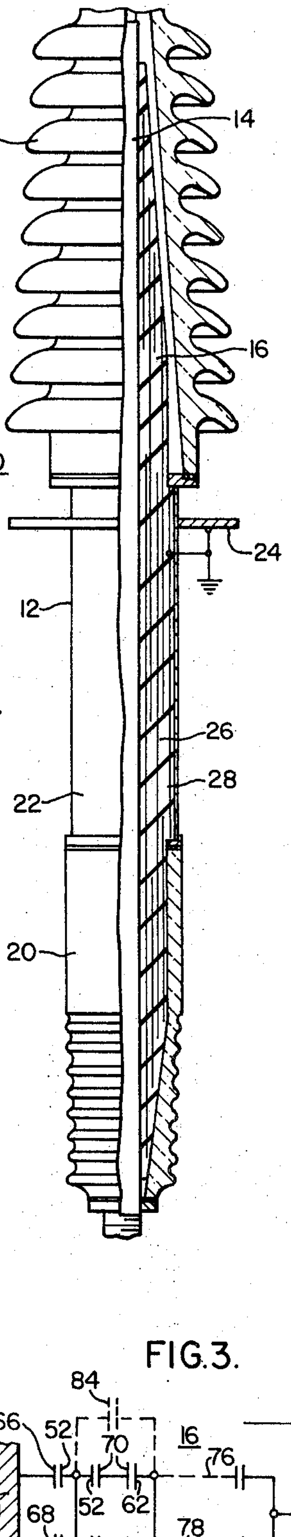
FIG. 1 is an elevational view, partly in section, of a condenser bushing constructed according to this invention.

Throughout the following description, similar reference characters refer to similar elements or members in all the figures of the drawing.

Referring now to the drawing, and to FIG. 1 in particular, there is shown a condenser bushing 10 which includes a casing structure 12, a lead tube 14, and a condenser structure 16. Construction of the bushing 10 may be similar to the bushings described in U.S. Pat. Nos. 3,462,545 and 3,659,033. Other types of bushing construction may be used with this invention, such as the cast epoxy type described in U.S. Pat. No. 3,627,906 which is assigned to the same assignee as is this invention.

The casing structure 12 of the preferred embodiment shown in FIG. 1 includes an upper insulator 18, a lower insulator 20, and a cylindrical support member 22. Flange 24 provides means for attaching the bushing 10 to the casing of the associated electrical apparatus, such as a power transformer. The lead tube 14 extends between the ends of the bushing 10 and conducts the current when the bushing is operating.

The condenser structure 16 is positioned between the lead tube 14 and the casing structure 12. The condenser structure 16 includes a plurality of conducting layers, such as layer 26, which are disposed within a solid insulating material 28. Normally, the conducting layers 26 are formed by winding a metallic foil between layers of solid cellulosic insulation. The conducting layers 26 function as capacitor plates and ideally distribute the voltage across the insulation uniformly. The outermost conducting layer is normally connected to ground potential.

Figure 2:
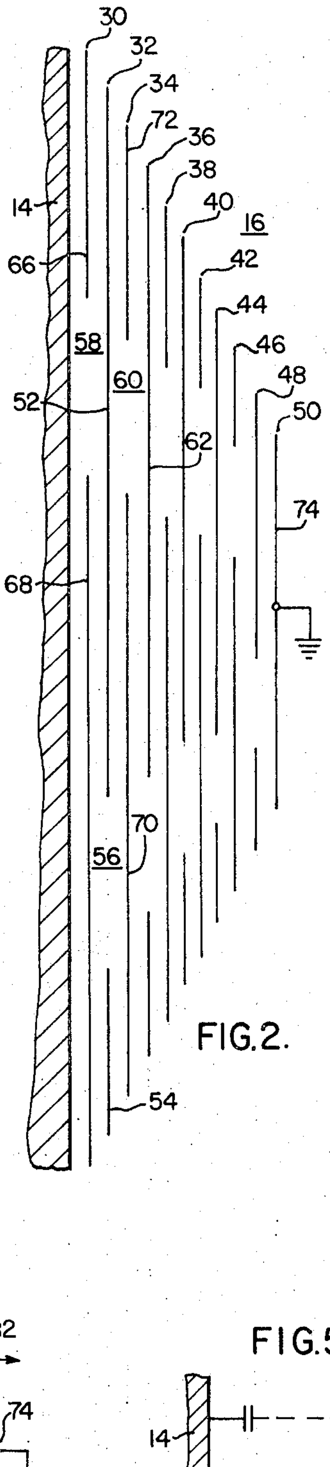
FIG. 2 is a physical schematic diagram of a condenser structure suitable for use in the bushing of FIG. 1.

One arrangement of the conducting layers is illustrated schematically in FIG. 2. By definition, a condenser element occupies substantially the same radial position in the condenser structure 16. The condenser elements 30, 32, 34, 36, 38, 40, 42, 44, 46 and 48 each include two conducting layers, such as conducting layers 52 and 54 of condenser element 32. The conducting layers contain a gap therebetween, such as gap 56, and are electrically independent in that no direct electrical connection exists between the conducting layers. The outermost condenser element 50 includes a single conducting layer 74 without any gap therein.

Adjacent condenser elements with the exception of element 50, contain gaps which are displaced from each other. For example, gap 56 of condenser element 32 is displaced from gap 58 of condenser element 30 and from gap 60 of condenser element 34. This pattern is repeated throughout the condenser structure 16. This displaced gap pattern allows one of the conducting layers of a condenser element to completely surround the gap in the adjacent condenser element.

The gaps, such as gaps 56 and 58, permit the desired reduction in capacitance between adjacent condenser elements. Gap distance is the distance between the inner ends of the conducting layers of the same condenser element which form the gap. The portion of the conducting layer 52 which is axially adjacent to the gap 58, and which has an axial dimension equal to the gap distance of gap 58, does not significantly contribute to the capacitance between the condenser elements 30 and 32. Due to this characteristic, the gap distance in each condenser element is less than that required to provide a similar capacitance distribution if the gaps are all substantially aligned with each other as taught by the prior art. Since every other conducting layer provides capacitive coupling through a gap, such as conducting layers 52 and 62, the desired gap distance is not simply one-half the distance of gaps which would be aligned with each other.

By displacing the gaps in adjacent condenser elements, the equipotential lines through the condenser structure 16 are substantially uniform and more efficient use is made of the insulating material 28. Although referred to as equipotential lines when discussing the schematic diagram of FIG. 2, in the actual condenser bushing 10 the equipotential points form a substantially cylindrical surface concentric with the lead tube 14. Manufacturing costs and techniques may determine the number of gaps contained in a condenser element and more than one gap may be used without departing form the spirit of the invention.

Figure 3:
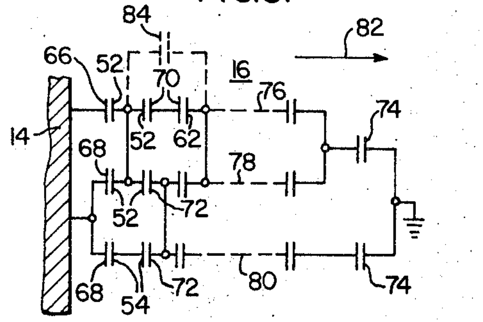
FIG. 3 is an electrical schematic diagram of the condenser structure shown in FIG. 2.

FIG. 3 is an electrical schematic diagram of the condenser structure 16 illustrated in FIG. 2. Some of the capacitor plates are numbered according to the corresponding conducting layers shown in FIG. 2. The capacitance structure provided by this invention as shown in FIG. 3 provides three capacitive branches 76, 78 and 80 which are alternately interconnected as the branches progress in the radial direction as indicated by arrow 82. Capacitor 84 represents the direct capacitance between the conducting layers 52 and 62. Other alternate conducting layer capacitances are not illustrated in FIG. 3 for clarity.

Figure 4:
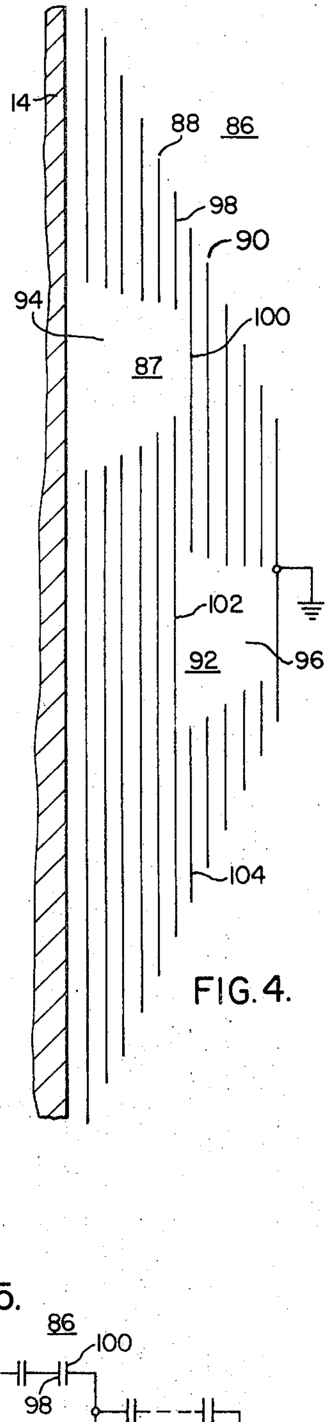
FIG. 4 is a physical schematic diagram of another condenser structure suitable for use in the bushing of FIG. 1.

The condenser structure 86 shown in FIG. 4 permits a substantial reduction in the maximum potential gradient without the necessity of displacing every gap from the gap in the adjacent condenser element. As shown in FIG. 4, the gap 87 of condenser element 88 is displaced from the gap 92 of condenser element 90. The remaining gaps are substantially aligned with one of the gaps 87 and 82. Although there is some concentration of potential gradient in regions 94 and 96, the amount of concentration is significantly lower than with prior art condenser structures.

Figure 5:
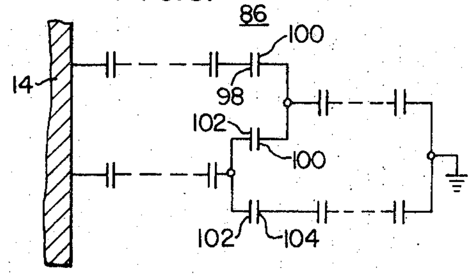
FIG. 5 is an electrical schematic diagram of the condenser structure shown in FIG. 4.

FIG. 5 represents an electrical schematic diagram of the condenser structure 86 which is illustrated in FIG. 4. A three-branch capacitance path is provided near the radial center of the condenser structure 86 by the conducting layers 98, 100, 102 and 104.

The inventions described schematically in FIGS. 2 and 4 may be combined without departing from the scope of the invention. For example, condenser structure 16 could have more than one intermediate condenser element between alternate condenser elements, with the gaps in the intermediate condenser elements substantially aligned with each other.

The condenser structures disclosed herein permit the necessary capacitance uniformity throughout the condenser structure with a significant reduction in potential gradient concentration over prior art arrangements. Thus, insulating material may be used more efficiently and a reduction in the size of the bushing is possible.

Since numerous changes may be made in the above-described apparatus and since different embodiments of the invention may be made without departing from the spirit thereof, it is intended that all of the matter contained in the foregoing description, or shown in the accompanying drawing, shall be interpreted as illustrative rather than limiting.

I claim:

1. A condenser bushing comprising: a longitudinal electrical lead;

a casing structure disposed around said lead; and at least two radially adjacent condenser elements concentrically disposed around said lead;

each of said condenser elements including only two electrically independent conducting layers having a gap between said layers, with said gaps in said radially adjacent condenser elements being axially displaced from each other so that one of the conducting layers of one condenser element completely surrounds the gap in the adjacent condenser element.

2. The condenser bushing of claim 1 including two additional radially adjacent condenser elements each containing at least two electrically independent conducting layers having a gap between said layers, one of said additional condenser elements being radially adjacent to one of the other radially adjacent condenser elements, with the gap in each of the four condenser elements being axially displaced from the gap in an adjacent condenser element.

3. The condenser bushing of claim 2 wherein the two additional condenser elements of the bushing each comprise only two electrically independent conducting layers.

4. A condenser bushing comprising:

a longitudinal electrical lead:

a casing structure disposed around said lead:

first and second condenser elements concentrically disposed around said lead, each of said first and second condenser elements including only two electrically independent conducting layers having a gap between said layers, with the gap in said first condenser element being completely surrounded by one of the conducting layers of said second condenser element;

a third condenser element positioned between said first condenser element and said lead, said third condenser element having only two conducting layers with a gap between said layers, with the center of the gap in said third condenser element being substantially aligned in the axial direction with the center of the gap in the first condenser element; and a fourth condenser element positioned between said second condenser element and said casing structure, said fourth condenser element having only two conducting layers with a gap between said layers, with the center of the gap in said fourth condenser element being substantially aligned in the axial direction with the center of the gap in the second condenser element.

5. The condenser bushing of claim 4 including a fifth condenser element which is positioned between the third condenser element and the lead, said fifth condenser element having a gap therein which is positioned radially adjacent to and substantially aligned in the axial direction with the gap in the third condenser element, and a sixth condenser element which is positioned between the fourth condenser element and the casing structure, said sixth condenser element having a gap therein which is positioned radially adjacent to and substantially aligned in the axial direction with the gap in the fourth condenser element.

6. A condenser bushing comprising:

a longitudinal electrical lead; 'a casing structure disposed around said lead;

first, second and third condenser elements each including at least two electrically independent conducting layers with a gap between said layers, said condenser elements being concentrically disposed around said lead with the first element radially adjacent to said second element and said second element radially adjacent to said third element, with the gaps in radially adjacent condenser elements being axially displaced from each other so that one of the conducting layers of a condenser element completely surrounds the gap in an adjacent condenser element, with at least a portion of a conducting layer from each of said first, second and third condenser elements positioned at the same axial position in said bushing.

* * * * *